United States Patent [19]
Allen et al.

[11] 3,890,783
[45] June 24, 1975

[54] DUAL PRESSURE CONTROL ASSEMBLY

[75] Inventors: Thomas E. Allen, Mustang; Don W. Smith, Edmond, both of Okla.

[73] Assignee: CMI Corporation, Oklahoma City, Okla.

[22] Filed: Apr. 1, 1974

[21] Appl. No.: 456,843

[52] U.S. Cl. .................. 60/420; 60/445; 60/465; 60/484; 60/488
[51] Int. Cl. ............................................. F16h 39/46
[58] Field of Search ............ 60/420, 445, 448, 465, 60/484, 488, 489

[56] References Cited
UNITED STATES PATENTS
2,936,712  5/1960  Van Gerpen.................. 60/420 UX
3,444,689  5/1969  Budzich........................ 60/445 X Primary Examiner—Edgar W. Geoghegan
Attorney, Agent, or Firm—Dunlap & Codding

[57] ABSTRACT

An improved pressure-responsive control assembly for use with a system employing a variable displacement pump selectively applying hydraulic pressure to two loads having different maximum working pressures. The dual pressure control assembly employs a hydraulic piston-actuated pressure adjustor assembly operating in conjunction with an override valve assembly which automatically reduces the swashplate angle of the variable displacement pump when either of the two maximum pressures is exceeded in the operation of the assembly.

9 Claims, 5 Drawing Figures

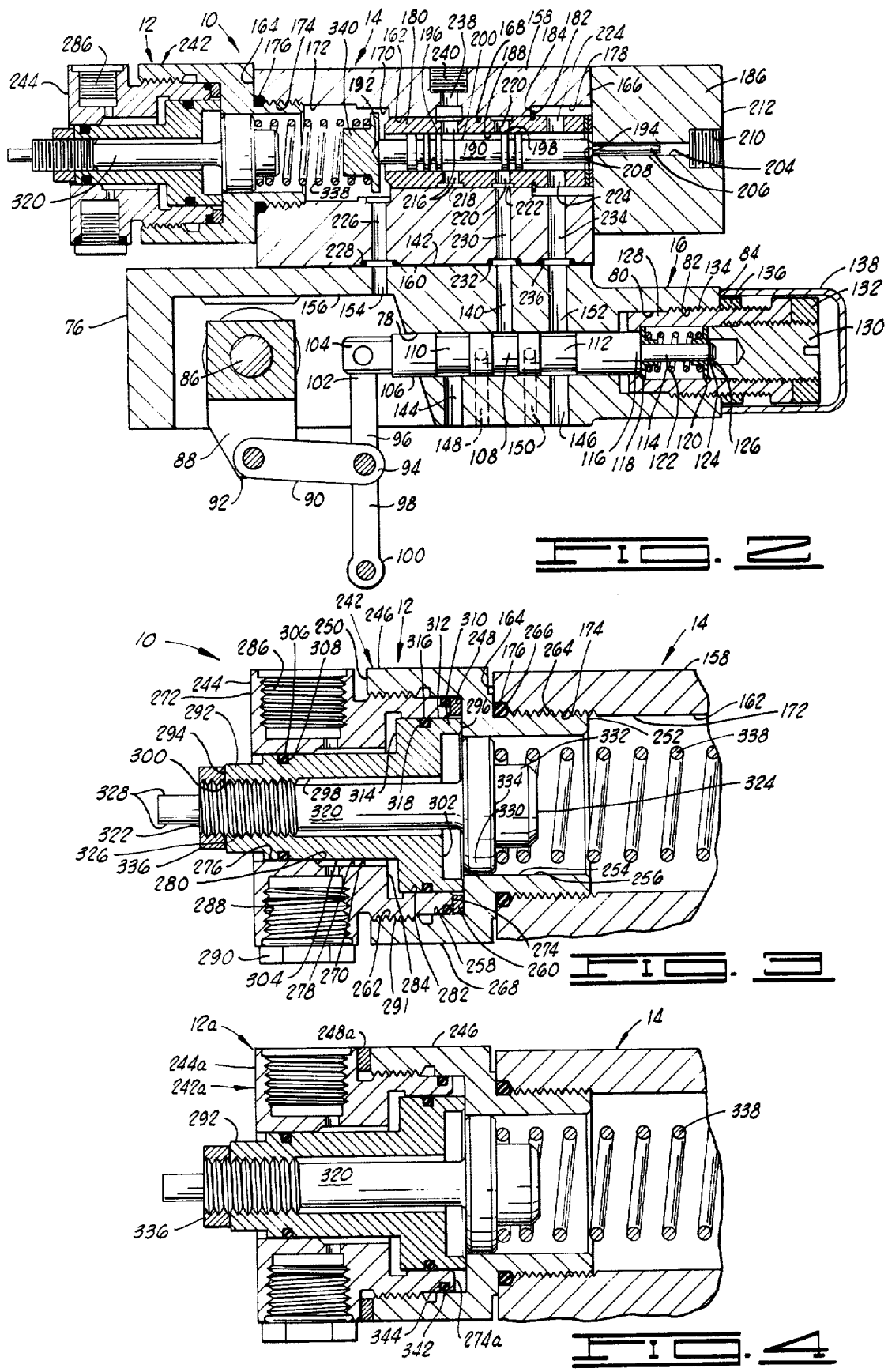

3,890,783

DUAL PRESSURE CONTROL ASSEMBLY

BACKGROUND OF THE INVENTION

1. Field of the Invention

This invention relates generally to improvements in hydrostatic systems, and more particularly, but not by way of limitation, to hydrostatic transmission systems wherein two maximum working pressures may be encountered during operation.

2. Description of the Prior Art

The prior art contains a number of teachings of hydrostatic systems in which a variable displacement pump is utilized to apply high pressure hydraulic fluid to a hydraulic motor for the transmission of power. The use of a hydraulic servo system to control the swashplate angle of the variable displacement pump is well known and is disclosed in Sunstrand Hydro-Transmission Bulletin 9565, Rev. C, dated Jan., 1972. Further, the use of an override valve assembly to automatically reduce the swashplate angle when a maximum working pressure has been exceeded is well known. The known prior art systems, are limited in that the override valve assembly which controls the swashplate angle of the variable displacement pump assembly is responsive only to one predetermined maximum pressure. If the known prior art systems are to be employed in a manner such that the variable displacement pump will be called upon to drive two loads, each with a different maximum working pressure, the lower maximum working pressure may be exceeded during operation thereby possibly causing damage to the system.

SUMMARY OF THE INVENTION

The present invention contemplates a dual pressure control assembly which allows the hydrostatic system in which it is employed to selectively automatically control the output pressure of the variable displacement pump in response to the exceeding of either of two differing maximum working pressures which may be encountered by the system.

An object of this invention is to increase the efficiency of hydrostatic transmission systems.

Another object of the invention is to provide a dual pressure control assembly for use with a hydrostatic transmission system which provides automatic override pressure control responsive to two different maximum working pressures.

A further object of the invention is to provide a dual pressure control assembly which is economical in construction and economical and reliable in operation.

Other objects and advantages of the invention will be evident from the following detailed description when read in conjunction with the accompanying drawings.

BRIEF DESCRIPTION OF THE DRAWINGS

FIG. 2 is a cross-sectional view of the dual pressure control assembly including the dual override pressure adjustor assembly, the override valve assembly and the control valve assembly.

FIG. 3 is an enlarged cross-sectional view illustrating the construction of the dual override pressure adjustor assembly.

FIG. 4 is an enlarged cross-sectional view, similar to FIG. 3, illustrating a slightly modified dual override pressure adjustor assembly.

DESCRIPTION OF THE PREFERRED EMBODIMENT

Figure 1:
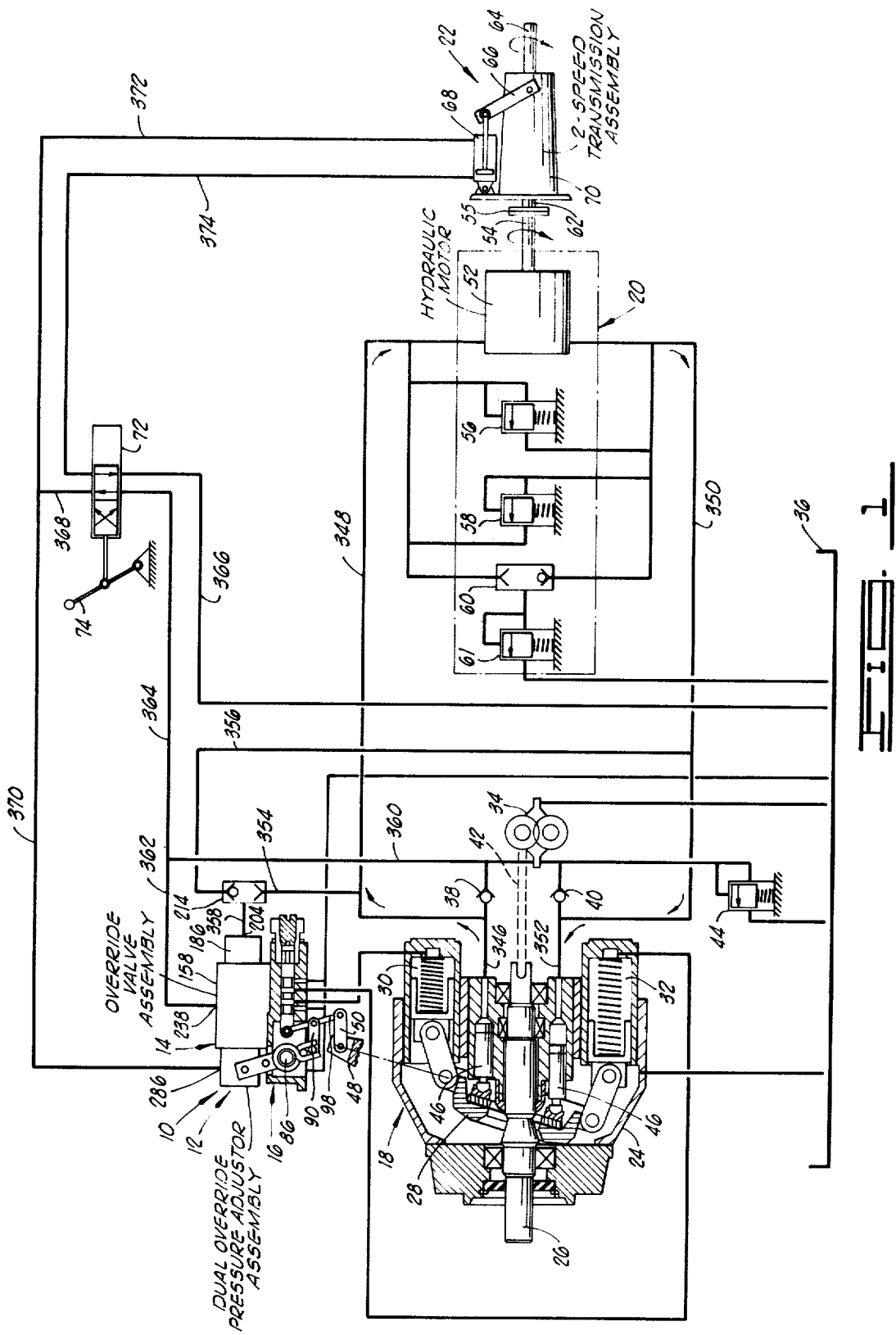
FIG. 1 is a diagrammatical illustration of the present invention employed with a hydrostatic transmission which includes a two-speed mechanical transmission.

Referring now to the drawings and to FIGS. 1, 2 and 3 in particular, the dual pressure control assembly of the present invention is generally designated by the reference character 10. The dual pressure control assembly 10 comprises a dual override pressure adjustor assembly 12 and an override valve assembly 14.

The dual pressure control assembly 10 is mounted on and provides selective hydraulic communication with a control valve assembly 16 as shown in FIGS. 1 and 2. The control valve assembly 16 is mechanically and hydraulically connected to a reversible variable displacement pump assembly 18. The reversible variable displacement pump assembly 18 is hydraulically connected to a fixed displacement motor assembly 20 which is, in turn, mechanically connected to a two-speed transmission assembly 22.

As illustrated in FIG. 1, the pump assembly 18 includes a pump housing 24 in which an input shaft 26 is journaled. A reversible swashplate 28 is transversely journaled in the pump housing 24. Rotation of the swashplate 28 about its transverse rotational axis within the pump housing is accomplished by applying hydraulic pressure to either of the servo control cylinders 30 or 32 while venting the other control cylinder to the tank.

The reversible variable displacement pump assembly 18 also includes a charge pump 34 which supplies hydraulic fluid to the suction side of the pump assembly 18 at a nominal pressure of approximately 200 p.s.i. from a suitable reservoir 36 via check valve 38 or check valve 40 depending upon whether the pump assembly 18 is in the forward or reverse mode. The charge pump 34 may be suitably driven directly from the input shaft 26 by a connecting shaft 42. The variable displacement pump assembly 18 also includes a charge relief valve 44 interposed between the outlet of the charge pump 34 and the reservoir 36. Hydraulic fluid is pressurized by the action of a plurality of axial pistons 46 whose associated cylinders communicate with the outlet of the charge pump 34 via the check valves 38 and 40 as the pump assembly 18 is operated through the rotation of the input shaft 26 in a conventional manner as is well known to those skilled in the art.

A swashplate position feedback arm 48 is fixedly secured to the swashplate 28 and extends outwardly therefrom in a direction substantially perpendicular to the transverse rotational axis of the swashplate 28. A connecting link 50 is pivotally secured at one end thereof to the swashplate position feedback arm 48.

The fixed displacement motor assembly 20 includes a conventional axial piston hydraulic motor 52 having a motor output shaft 54 journaled therein and mechanically connected, via a suitable clutch mechanism 55, to the two-speed transmission assembly 22. The motor assembly 20 also includes a pair of high pressure relief valves 56 and 58, a shuttle valve 60 and a charge pressure relief valve 61 connected by suitable conduits to the axial piston motor 52 to provide means for releasing high pressure oil or the charge pressure oil to the reservoir 36 in the event a predetermined pressure associated therewith is exceeded in the operation of the system.

The motor output shaft 54 of the fixed displacement motor assembly 20 is mechanically connected, via the clutch mechanism 55, to the input shaft 62 of the two-speed transmission assembly 22. The transmission assembly 22 also includes a transmission output shaft 64 which may be suitably connected to drive wheels or tracks (not shown) or the like. A transmission shift lever 66 is connected to the transmission assembly 22 and provides direct mechanical means for internally shifting the transmission assembly 22 between the two input-output gear ratios thereof. A shift lever actuator hydraulic cylinder 68 is connected between the transmission housing 70 and the transmission shift lever 66. When pressurized hydraulic fluid from the charge pump 34 is applied to the piston end of the shift lever actuator power cylinder 68, the transmission shift lever 66 is rotated in a clockwise direction as viewed in FIG. 1 and the transmission assembly 22 is placed in high gear. When pressurized hydraulic fluid is applied to the rod end of the shift lever actuator power cylinder 68 from the charge pump 34, the transmission shift lever 66 is rotated in a counterclockwise direction, as viewed in FIG. 1, and the transmission assembly 22 is placed in low gear as shown in FIG. 1. As used herein, the ratio of input shaft speed to output shaft speed in the transmission assembly 22 is greater in low gear than in high gear.

A two-way control valve 72 is interposed between the charge pump 34 and the shift lever actuator power cylinder 68. The control valve 72 may be suitably actuated by means of a manual control lever 74 or other suitable means to provide pressurized hydraulic fluid to the rod end or the piston end of the power cylinder 68 to cause a resulting shifting of gears of the two-speed transmission assembly 22.

Referring now to FIG. 2, the control valve assembly 16 includes a control valve housing 76 having a longitudinal bore 78 extending partially therethrough. A counterbore 80 is formed in one end of the bore 78. Internal threads 82 extend from the counterbore 80 to intersect one end portion 84 of the control valve housing 76.

A transverse control shaft 86 is journaled in the housing 76. An arm 88 is fixedly secured to the shaft 86 and extends downwardly therefrom. A rigid link 90 is pivotally secured at one end 92 thereof to the arm 88. The opposite end 94 of the link 90 is pivotally secured to the medial portion 96 of a control valve link 98. The lower end portion 100 of the control valve link 98 is pivotally secured to the end of the connecting link 50 of the pump assembly 18 opposite the end connected to the swashplate feedback arm 48, as shown in FIG. 1. The upper end portion 102 of the control valve link 98 is pivotally secured to one end 104 of a control valve spool 106 slidably disposed within the bore 78 of the housing 76.

The control valve spool 106 includes a first annular groove 108 formed in the medial portion thereof. Second and third annular grooves 110 and 112 are formed in the control valve spool 106 on opposite sides of the first annular groove 108.

A cylindrical extension 114 extends from the opposite end 116 of the control valve spool 106. Centering spring washers 118 and 120 are slidably disposed on the cylindrical extension 114 with a helical centering spring 122 disposed therebetween and around a cylindrical extension 114. The centering spring washer 120 is retained on the outer end of the cylindrical extension 114 by means of a spring clip 124 seated in an annular groove 126 formed in a cylindrical extension 114.

The centering spring washers 118 and 120, the centering spring 122 and the cylindrical extension 114 of the control valve spool 106 are retained within a substantially cylindrical centering spring housing 128 by means of a spring adjusting screw 130 threadedly secured within one end of the centering spring housing 128. By threadedly adjusting the spring adjusting screw 130 relative to the centering spring housing 128, the preload of the centering spring 122 may be adjusted to a suitable value. When the centering spring 122 is suitably preloaded, the relative position of the spring adjusting screw 130 to the centering spring housing 128 is secured by means of a threaded jam nut 132 which is threadedly secured to the spring adjusting screw 130.

The centering spring housing 128 includes external threads 134 formed thereon which are threadedly engaged with the internal threads 82 of the control valve housing 76. By rotating the centering spring housing 128 relative to the control valve housing 76, the longitudinal position of the control valve spool 106 within the bore 78 may be adjusted. When the longitudinal position of the control valve spool 106 is properly adjusted, the position of the centering spring housing 128 relative to the control valve housing 76 may be secured by means of locking nut 136 which is threadedly secured to the external threads 134 of the centering spring housing 128. When the centering spring preload has been adjusted and the longitudinal position of the control valve spool 106 has been adjusted, as described above, cover 138 is suitably secured to the control valve housing 76 to prevent inadvertent disturbance of these adjustments.

A passageway 140 is formed in the control valve housing 76 and communicates between the bore 78 and the top side 142 of the control valve housing 76. When the control valve spool 106 is properly centered within the housing 76, the passageway 140 intersects the bore 78 at a point communicating with the center of the first annular groove 108. In a similar manner, a second passageway 144 is formed in the control valve housing 76 and communicates with the bore 78 in communication with the second annular groove 110 of the control valve spool 106 and provides the communication through a control valve passage 76 from the bore 78 to the reservoir 36 (see FIG. 1) by a suitable conduit. A third passageway 146 is also formed in the control valve housing 76 and communicates with the bore 78 and the third annular groove 112 of the control valve spool 106. The passageway 146 provides communication from the bore 78 to the reservoir 36 by means of a suitable conduit.

First and second power passageways 148 and 150 are formed in the control valve housing 76 and each communicate with the bore 78 therethrough. Power passageway 148 intersects the bore 78 at a point intermediate the first annular groove 108 and the second annular groove 110 of the centering control valve spool 106. Power passageway 150 intersects the bore 78 at a point intermediate the first annular groove 108 and the third annular groove 112 of the centering control valve spool 106. Power passageway 148 provides communication between the bore 78 of the control valve housing 76 and the servo control cylinder 30 of the pump assembly 18. Power passageway 150 provides communication between the bore 78 of the control valve housing 76 and the servo control cylinder 32 of the pump assembly 18. This hydraulic communication between the power passageways 148 and 150 and the pump assembly 18 is illustrated schematically in FIG. 1.

A passageway 152 is formed in the control valve housing 76 and communicates between the bore 78 adjacent to the third annular groove 112 of the control valve spool 106 and the top side 142 of the control valve housing 76. Passageway 154 communicates between the top side 142 of the control valve housing 76 and a cavity 156 formed in the control valve housing 76. The cavity 156 communicates with the reservoir 36 by means of a suitable conduit, as illustrated schematically in FIG. 1 to provide hydraulic fluid drainage from the cavity 156.

The override valve assembly 14 includes a pressure override housing 158 which is mounted on the control valve housing 76, with its bottom side 160 engaging the top side 142 of the control valve housing 76, by suitable bolts (not shown).

A longitudinal passageway 162 extends through the housing 158 and intersects the first and second end faces 164 and 166 thereof. The passageway 162 includes a cylindrical bore 168 formed in the medial portion thereof. First and second counterbores 170 and 172 are formed in passageway 162 coaxial with the bore 168 and intermediate the bore 168 and the first end face 164. Internal threads 174 are formed in the passageway 162 intermediate the counterbore 172 and the first end face 164. A counterbore 176 is formed in the passageway 162 intermediate the threads 174 and the first end face 164 and intersects the first end face 164. A counterbore 178 is formed in the passageway 162 coaxial with and intermediate the bore 168 and the second end face 166 of the housing 158, and intersects the second end face 166.

A cylindrically shaped pressure override sleeve 180 is positioned within the bore 168 and is longitudinally retained therein by means of an annular snap ring 182 carried thereon which bears against an annular shoulder 184 which extends between the counterbore 178 and the bore 168, and by a valve cover 186 fixedly secured to the second end face 166 of the housing 158 by suitable bolts (not shown). A longitudinal bore 188 extends through the sleeve 180 intersecting the opposite ends thereof. A pressure override valve spool 190 is slidably disposed within the longitudinal bore 188 and includes first and second end faces 192 and 194. The valve spool 190 includes first and second annular lands 196 and 198 separated by an annular groove 200. The portion of the valve spool 190 intermediate the annular land 198 and the second end face 194 has a diameter substantially equal to that of the annular groove 200.

The valve cover 186 includes a longitudinal bore 204 extending therethrough in coaxial alignment with the valve spool 190. The diameter of the bore 204 is substantially less than the diameter of the bore 188 through the sleeve 180. A cylindrically shaped piston or pin 206 is slidably disposed within the bore 204 with the inner end face 208 thereof in abutting engagement with the second end face 194 of the pressure override valve spool 190. The longitudinal bore 204 includes internal threads 210 communicating with the end face 212 of the valve cover 186 providing means for attachment of a suitable conduit interconnecting the longitudinal bore 204 and a shuttle valve 214 as shown in FIG. 1. It will be understood that shuttle valve 214 may be formed as an integral part of the valve corner 186 if so desired.

The pressure override sleeve 180 includes a pair of ports 216 communicating between the bore 188 and an annular groove 218 formed in the outer periphery of the pressure override sleeve 180. The ports 216 intersect the bore 188 intermediate the first and second annular lands 196 and 198 of the pressure override valve spool 190, as shown in FIG. 2.

A second pair of ports 220 are formed in the pressure override sleeve 180 and communicate between the longitudinal bore 188 and a second annular groove 222 formed in the outer periphery of the pressure override sleeve 180. The ports 220 intersect the pressure override sleeve 180 immediately adjacent to the annular land 198 of the pressure override valve spool 190 such that any movement of the pressure override valve spool 190 to the left within the pressure override sleeve 180, as viewed in FIG. 2, will cause the annular land 198 to progressively occlude the ports 220 thereby restricting fluid flow therethrough.

A third pair of ports 224 are formed in the pressure override sleeve 180 and communicate between the longitudinal bore 188 and the outer periphery of the pressure override sleeve 180 providing fluid communication between the interior of the pressure override sleeve 180 to the right of the annular land 198 of the pressure override valve spool 190 and the annular space surrounding the pressure override sleeve 180 formed by the counterbore 178 in the pressure override housing 158.

A passageway 226 is formed in the pressure override housing 158 and communicates between the cylindrical surface formed by the counterbore 170 and the bottom side 160 of the pressure override housing 158. The passageway 226 communicates with the passageway 154 of the control valve housing 76 and a fluid tight seal is formed therebetween by an O-ring 228.

A passageway 230 is formed in the pressure override housing 158 and communicates between the bore 168 of the housing 158 adjacent to the annular groove 222 of the pressure override sleeve 160 and the bottom side 160 of the housing 158. The passageway 230 is in communication with the passageway 140 of the control valve housing 76 and a fluid tight seal is formed therebetween by an O-ring 232.

A passageway 234 is formed in the pressure override housing 158 and communicates between the cylindrical surface of the counterbore 178 and the bottom side 160 of the housing 158. The passageway 234 communicates with the passageway 152 of the control valve housing 76 and a fluid tight seal is formed therebetween by an O-ring 236.

A passageway 238 is formed in the pressure override housing 158 and communicates between the bore 168 therethrough adjacent to the annular groove 218 of the pressure override sleeve 180 and the exterior of the pressure override housing 158. The passageway 238 includes an internally threaded portion 240 which provides means for hydraulic connection of the passageway 238 to the output of the charge pump 34 by means of a suitable conduit as illustrated in FIG. 1.

The dual override pressure adjustor assembly 12 includes a body assembly 242 comprising a body member 244, an adaptor member 246 and an annular spacer or washer 248. The adaptor member 246 includes a first end face 250 and a second end face 252 with a passageway 254 extending therethrough and intersecting the first and second end faces 250 and 252. The passageway 254 includes a longitudinal bore 256 which intersects the second end face 252. A counterbore 258 is formed in the passageway 254 adjacent the first end face 250 and forms an annular shoulder 260 which intersects the bore 256. Internal threads 262 are formed in the passageway 254 intermediate the counterbore 258 and the first end face 250 and intersect the first end face 250.

External threads 264 are formed on the adaptor member 246 adjacent to and intersecting the second end face 252. The external threads 264 are threadedly engaged with the internal threads 174 of the override valve assembly 14 thereby placing the longitudinal bore 256 of the adaptor member 246 in coaxial alignment with the pressure override valve spool 190. A suitable seal is provided between the adaptor member 246 and the pressure override housing 158 by means of an O-ring 266. The outer periphery 268 of the adaptor member 246, intermediate the first end face 250 thereof and the pressure override housing 158, is preferably hexagonal in transverse cross-section to facilitate the threaded engagement between the adaptor member 246 and the pressure override housing 158 by means of a suitable wrench.

The body member 244 includes a longitudinal passageway 270 extending therethrough and intersecting the first and second end faces 272 and 274 thereof. The longitudinal passageway 270 includes a longitudinal bore 276 extending partially therethrough and intersecting the first end face 272. A first counterbore 278 is formed in the longitudinal passageway 270 and forms an annular shoulder 280 which intersects the longitudinal bore 276. A second counterbore 282 is formed in the longitudinal passageway 270 intersecting the second end face 274 and forming an annular shoulder 284 which intersects the first counterbore 278.

The body member 244 includes two internally threaded ports 286 and 288 each of which communicates between the exterior of the body member 244 and the cylindrical surface of the first counterbore 278. A threaded plug 290 is used to close one of these ports, in this case port 288, while the other port 286 is threadedly engaged with a suitable conduit providing connection between the dual override pressure adjustor assembly 12 and the two-way control valve 72, as shown in FIG. 1. This physical arrangement assures that one of the ports 286 will be easily accessible for connection to the suitable conduit after the body member 244 is connected to the threads 262 of the adaptor member 246 by means of the external threads 291 formed on the body member 244.

The dual override pressure adjustor assembly 12 further includes a piston 292 having a first end face 294, a second end face 296 and a longitudinal passageway 298 extending through and intersecting the end faces 294 and 296. The passageway 298 includes an internally threaded portion 300 formed therein adjacent to and intersecting the first end face 294. A counterbore 302 is formed in the passageway 298 adjacent to and intersecting the second end face 296.

The piston 292 is slidably disposed within the longitudinal passageway 270 of the body member 244. The cylindrically shaped outer periphery 304 of the piston 292 is slidably received within the longitudinal bore 272 of the passageway 270. A sliding fluid tight seal is provided between the outer periphery 304 and the bore 276 by an O-ring 306 mounted in an annular groove 308 formed in the outer periphery 304. A cylindrically shaped flange 310 is formed on the piston 292 and includes a cylindrical outer periphery 312 which intersects the second end face 296. The outer periphery 312 has a diameter greater than the outer periphery 304 and is connected to the outer periphery 304 by an annular shoulder 314. A fluid tight sliding seal is provided between the outer periphery 312 and the cylindrical surface of the counterbore 282 of the longitudinal passageway 270 by an O-ring 316 mounted in an annular groove 318 formed in the outer periphery 312.

A pressure override spring adjustor 320, having a first end portion 322 and a second end portion 324, is mounted within the piston 292. The spring adjustor 320 includes external threads 326 formed on the first end portion 322 and threadedly engaged with the internally threaded portion 300 of the piston 292. Wrench flats 328 are formed on the first end portion 322 adjacent to the external threads 326. A cylindrically shaped flange 330 is formed on the second end portion 324 of the spring adjustor 320. A second cylindrically shaped flange 332 is formed on the second end portion 324 and an annular shoulder provides interconnection between the flanges 330 and 332.

A lock nut 336 is threadedly engaged with the external threads 326 of the pressure override spring adjustor 320. The lock nut 336 preferably includes an integral internal annular elastomeric seal (not shown) which provides a fluid tight seal between the lock nut 336, the spring adjustor 320 and the piston 292 when the lock nut 336 is threaded tightly against the first end face 294 of the piston 292 as shown in FIG. 3.

A pressure override compression spring 338 extends between the annular shoulder 334 of the pressure override spring adjustor 320 and a pressure override spring seat 340 engaged with the first end face 192 of the pressure override valve spool 190.

The elements of the dual override pressure adjustor assembly 12 are sized such that the amount of the longitudinal movement available to the piston 292 within the body assembly 242 is preferably substantially equal to the longitudinal thickness of the annular spacer or washer 248. It will be seen that by selecting an annular space 248 of a particular longitudinal thickness, the length of piston stroke may be determined at the time of assembly of the dual override pressure adjustor assembly 12.

FIG. 4 illustrates a slightly modified version of the dual pressure override adjustor assembly of the present invention which will be designated by the reference character 12a. The adjustor assembly 12a differs from the previously described adjustor assembly 12 only in the location of the annular spacer or washer 248a positioned between the adaptor member 246 and the slightly modified body member 244a. The position of the annular spacer 248a permits the determination of the amount of longitudinal piston travel within the body assembly 242a by means of visual inspection of the spacer 248a. The body member 244a is slightly modified in that an O-ring 342 is positioned in an annular groove 344 formed in the body member 244a adjacent to the end face 274a thereof.

OPERATION OF THE PREFERRED EMBODIMENT

Referring now to FIGS. 1 and 2, it will be seen that a conventional hydrostatic transmission is disclosed therein wherein a reversible variable displacement pump assembly 18 drives the input shaft 62 of a two-speed transmission assembly 22 through a fixed displacement motor assembly 20, the motor output shaft 54 and clutch mechanism 55. The displacement of the reversible variable displacement pump assembly 18 is controlled by rotation of the control shaft 86 by suitable means, either manual, mechanical or hydraulic. Rotation of the control shaft 86 causes a resulting movement of arm 88, and the links 50, 90, and 98 relative to the swash-plate position feedback arm 48, which in turn causes relative movement of the control valve spool 106 within the control valve housing 76, thereby directing the proper amount of pressurized hydraulic fluid through the first and second power passageways 148 and 150 to and from the respective servo control cylinders 30 and 32 to cause angular displacement of the swashplate 28 in response thereto. Such control of the swashplate angle is well known in the hydrostatic transmission art and need not be described in further detail.

It will be understood that when the two-speed transmission assembly 22 is in high gear, a' illustrated in FIG. 1, the torque available at the output shaft 64 in response to a given torque input at the input shaft 62 is less than the torque output at the output shaft 64 at the same torque input at the input shaft 62 when the two-speed transmission assembly 22 is placed in low gear.

It is desirable in the design of hydrostatic transmissions to provide means for limiting the maximum torque output from a hydraulic motor such that it will not exceed the maximum torque which may be applied to the particular load being driven by the transmission. When the two-speed transmission assembly 22 is placed in low gear, a mechanical torque multiplication is provided which should be accompanied by a corresponding reduction in the maximum torque output from the hydraulic motor 52 applied to the input shaft 62 of the transmission assembly 22. The override valve assembly 14 of the present invention provides means for limiting the torque output of the motor 52 of the motor assembly 20 by automatically adjusting the swashplate angle of the pump assembly 18 to reduce the displacement of the pump assembly 18 when the pressurized hydraulic fluid from the pump assembly 18 and directed to the motor assembly 20 reaches a predetermined maximum pressure associated with the maximum torque output to be provided by the motor assembly 20.

As shown in FIG. 1, high pressure fluid is delivered from the pump assembly 18 through conduits 346 and 348 to the motor assembly 20. Low pressure hydraulic fluid returns from the motor assembly 20 to the pump assembly 18 via conduits 350 and 352. Conduits 354 and 356 connect the shuttle valve 214 to conduits 348 and 350, respectively. Conduit 358 connects the shuttle valve 214 to the longitudinal bore 204 of the valve cover 186. The output of the charge pump 34 is connected to the passageway 238 of the pressure override housing 158 via conduits 360 and 362. Conduit 364 connects conduit 360 to the two-way control valve 72. Conduit 366 connects the control valve 72 to the reservoir 36. The control valve 72 is further connected to port 286 of the body assembly 242 of the dual override pressure adjustor assembly 12 via conduits 368 and 370. Conduit 372 connects conduit 368 to the rod end of the shift lever actuator power cylinder 68 while conduit 374 connects the piston end of the power cylinder 68 to the two-way control valve 72.

It will be seen that the hydraulic fluid provided at a pressure of approximately 200 p.s.i. by the charge pump 34 through the conduits 360 and 362 flows through the passageway 238, annular groove 218, port 216, into the longitudinal bore 188 intermediate the annular lands 196 and 198 of the pressure override valve assembly 190. When the high pressure hydraulic fluid from the pump assembly 18 through the shuttle valve 214 and into the longitudinal bore 204 is below the predetermined override or maximum allowable pressure, the pressure override valve spool 190 is urged all the way to the right in the pressure override sleeve 180, as viewed in FIG. 2, by the pressure override compression spring 338 thereby allowing hydraulic fluid at control pressure to flow from the longitudinal bore 188 through the ports 220, annular groove 222 and the passageway 230 of the override valve assembly 14 into the passageway 140 of the control valve assembly 16, as shown in FIG. 2, in the manner as described above.

With the two-way control valve 72 and the manual control lever 74 in the position shown in FIG. 1, pressurized hydraulic fluid from the charge pump 34 is directed through conduits 360, 364, 368 and 370 to the port 286 and into the cavity surrounding the piston 292 and defined by the O-rings 306 and 316, the counterbore 278, annular shoulders 280 and 284, counterbore 282, and longitudinal bore 276 of the body member 244, and the cylindrically shaped outer peripheries 304 and 312 and the annular shoulder 314 of the piston 292. The hydraulic pressure acts on an annular area of the piston 292 defined by the diameters of the longitudinal bore 276 and the counterbore 282 of the body member 244 thereby urging the piston 292 to the right as viewed in FIG. 2 thus increasing the preload on the pressure override compression spring 338 so that resistance to movement of the pressure override valve spool 190 to the left, in response to high pressure hydraulic fluid applied to the longitudinal bore 204 and the piston or pin 206, is increased thereby establishing a higher override pressure for the system.

It will be seen that if the manual control lever 74 is moved to the right thereby shifting the two-way control valve 72 to the right, as viewed in FIG. 1, the two-speed transmission assembly 22 is shifted to low gear and the hydraulic pressure from the output of the charge pump 34 is no longer applied to the port 286 of the dual override pressure adjustor assembly 12 thereby allowing the piston 292 to move to the left, as viewed in FIG. 2, to reduce the preload on the pressure override compression spring 338 thus reducing the bias against the pressure override valve spool 190 resisting movement thereof to the left and thereby lowering the override pressure of the system when the transmission assembly 22 is in low gear.

It will be seen that by selecting and installing an annular spacer 248 of a particular thickness, the differential between override pressures for the system may be predetermined. It will also be seen that by threadedly adjusting the pressure override spring adjustor 320 relative to the piston 292, the maximum override pressure may be established for the system.

When the hydraulic pressure applied through the longitudinal bore 204 to the piston 206 of the override valve assembly 14 exceeds the override pressure established by the preload of the pressure override compression spring 338 and the longitudinal position of the piston 292 within the body member 244, the pressure override valve spool 190 moves to the left against the urging of the pressure override compression spring 338 and the annular land 198 progressively occludes the ports 220 in the pressure override sleeve 180 thereby restricting the flow of control fluid through the control valve assembly 16 to the servo control cylinders 30 and 32 thereby causing an initial decrease in the swashplate angle resulting in a corresponding initial reduction in the pressure of the hydraulic fluid from the pump assembly 18. If the hydraulic pressure applied to the piston 206 continues to exceed the established override pressure, the pressure override valve spool 190 continues to move to the left within the pressure override sleeve until the annular land 198 completely blocks any flow of control fluid from the charge pump 34 through the ports 220 and begins placing the ports 220 and 222 in fluid communication via the longitudinal bore 188 in the pressure override sleeve 180 to the right side of the annular land 198 of the pressure override valve spool 190. It will be seen that this last-mentioned positioning of the pressure override valve spool 190 causes both servo control cylinders 30 and 32 to be placed in fluid communication with the reservoir 36 thus causing the swashplate angle of the pump assembly to decrease until the pressure of the hydraulic fluid from the pump assembly 18 is reduced below the predetermined override pressure.

When the hydraulic fluid pressure is reduced below the predetermined override pressure the pressure override compression spring 338 causes the valve spool 190 to again move to the right within the pressure override sleeve 180 until the ports 220 are again uncovered permitting the control fluid to again flow through the override valve assembly 14 and control valve assembly 16 to the servo control cylinders 30 and 32.

It should also be noted at this time that the dual override pressure adjustor assembly 12 and override valve assembly 14 provide another important advantage in the operation of the hydraulic system.

In the case where the hydraulic system is in the operating mode wherein the higher working pressure is being monitored by the dual override pressure adjustor assembly 12, the dual pressure control assembly provides an additional safety factor. Since the dual override pressure adjustor assembly 12 is actuated in this mode by pressurized hydraulic fluid from the charge pump 34 acting on the piston 292, it will be seen that, by proper selection of spring rate of the pressure override compression spring 338 and annular area of the piston 292 upon which the pressurized hydraulic fluid acts, if the pressure of the hydraulic fluid acting on the piston 292 drops below a predetermined level, the piston 292 will move to the left thereby decreasing the preload on the spring 338 and decreasing the override pressure which will actuate the pressure override valve spool 190 as described above. The action will, in turn, cause a corresponding reduction in swashplate angle and hydraulic fluid pressure from the pump assembly 18 which will indicate to the operator that the pump assembly 18 is not functioning properly.

Typically, such a reduction in hydraulic pressure from the charge pump may be caused by extreme wear in the charge pump 34 or the pump assembly 18. By warning the operator of such possible conditions, total pump failure may be avoided by a cessation of operation of the system until appropriate repairs have been made.

DESCRIPTION OF THE EMBODIMENT OF FIG. 5

Figure 5:
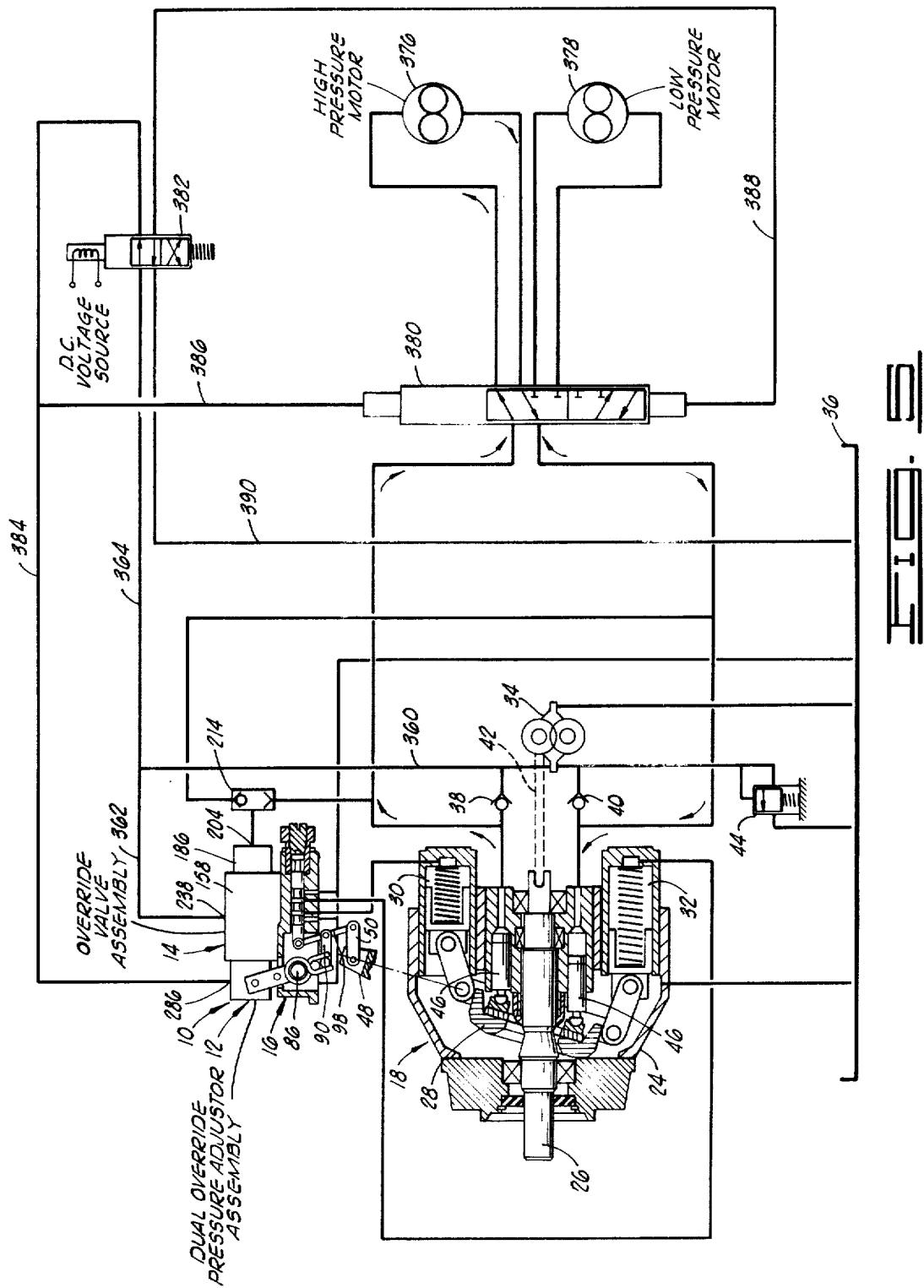
FIG. 5 is a diagrammatical illustration of another form of hydrostatic transmission system employing the dual pressure control assembly of the present invention.

FIG. 5 illustrates an alternative hydraulic system in which the dual pressure control assembly 10 of the present invention may be advantageously employed. The dual pressure control assembly 10, dual override pressure adjustor assembly 12, override valve assembly 14, control valve assembly 16 and reversible variable displacement pump assembly 18 illustrated therein are substantially identical to those elements previously described in the system shown in FIG. 1.

In the system illustrated in FIG. 5, the pump assembly 18 selectively provides high pressure hydraulic fluid to one of two hydraulic motors 376 and 378. The hydraulic motor 376 has a higher working pressure than the hydraulic motor 378. The motors 376 and 378 are selectively placed in hydraulic communication with the pump assembly 18 by means of a hydraulic pressure pilot operated valve 380 which is actuated by a two-way control valve 382. The control valve 382 may be solenoid operated by means of the application of a d.c. voltage from a suitable source, as illustrated, or may be otherwise suitably actuated such as by mechanical or manual means.

It will be seen that when the high pressure hydraulic motor 376 is connected to the pump assembly 18, the valves 380 and 382 are in the condition illustrated in FIG. 5. Hydraulic fluid from the charge pump 34 communicates with the dual override pressure adjustor assembly 12 to act upon the piston 292 via conduits 360 and 364, two-way control valve 382, and conduit 384. This same hydraulic pressure is applied to the upper end of the pilot operated valve 380 via conduit 386 communicating between the upper end of the pilot operated valve 380 and the conduit 384. It will also be seen that the lower end of the pilot operated valve 380 communicates with the reservoir 36 via conduit 388, two-way control valve 382, and conduit 390.

The system illustrated in FIG. 5 is switched to place the low pressure hydraulic motor 378 in communication with the pump assembly 18 by actuating the two-way control valve 382 such that pressurized hydraulic fluid from the output of the charge pump 34 is applied to the bottom of the pilot operated valve 380 via conduits 360 and 364, control valve 382 and conduit 388. The upper end of the pilot operated valve 380 is placed in communication with the reservoir 36 via conduits 386 and 384, control valve 382 and conduit 390. It will also be seen that when the control valve 382 is so actuated, port 286 of the dual override pressure adjustor assembly 12 is also placed in communication with the reservoir 36 via conduit 384, control valve 382 and conduit 390, thereby releasing the additional preload on the pressure override compression spring 338 and lowering the override pressure of the system.

It will be seen that the operation of the dual pressure control assembly 10 and dual override pressure adjustor assembly 12 in the system illustrated in FIG. 5 is substantially identical to that previously described in the system shown in FIG. 1.

Changes may be made in the construction and arrangement of parts or elements of the various embodiments as disclosed herein without departing from the spirit and scope of the invention as defined.

What is claimed is:

1. In a hydrostatic transmission system of the type which includes a hydraulically servo controlled variable displacement pump which selectively provides pressurized hydraulic fluid to either of two loads having higher and lower maximum working pressures, respectively, a control valve assembly for directing pressurized control fluid to said servo controlled variable displacement pump to vary the swashplate angle of the pump in response to an external control signal, and a source of pressurized control fluid for providing pressurized control fluid to the control valve assembly, the improvement comprising:

override valve assembly means interposed between the source of pressurized control fluid and the control valve assembly for reducing the flow of pressurized control fluid therethrough to the control valve assembly to reduce the swashplate angle of the pump when the maximum working pressure of either load is exceeded, said override valve assembly means including a slidable spool valve member carried therein and having first and second ends, a conduit communicating between the first end of the spool valve member and the pressurized hydraulic fluid from the variable displacement pump, spring means operatively engaging the second end of the spool valve member for biasing the spool valve member against the pressure of the pressurized hydraulic fluid from the variable displacement pump whereby the override valve assembly means provides substantially unrestricted flow of pressurized control fluid therethrough when the maximum working pressure of either load is not exceeded;

override conduit means interconnecting the source of pressurized control fluid and said override valve assembly means for providing pressurized control fluid to said override valve assembly from the source of pressurized control fluid;

a dual override pressure adjustor assembly carried by said override valve assembly means and including a body assembly carried by said override valve assembly means, piston means slidably disposed within the body assembly with one end portion thereof operatively engaging the spring means of said override valve assembly means, and a port formed in the body assembly communicating with the opposite end portion of the piston means;

control valve means for alternately selecting, in response to stimulus external thereto, one of the two loads to which pressurized hydraulic fluid is provided by the variable displacement pump;

first dual override conduit means for interconnecting the source of pressurized control fluid and said control valve means;

second dual override conduit means for interconnecting the port in the body assembly of said dual override pressure adjustor assembly and said control valve means; and valve member means in said control valve means intermediate said first and second dual override conduit means for placing the piston means in fluid communication with the source of pressurized control fluid to increase the bias of the spring means on the spool valve member against the pressure of the hydraulic fluid from the variable displacement pump when the variable displacement pump is providing pressurized hydraulic fluid to the load having the higher maximum working pressure and, ultimately, blocking fluid communication between the source of pressurized control fluid and the piston means to decrease the bias of the spring means on the spool valve member against the pressure of the hydraulic fluid from the variable displacement pump when the variable displacement pump is providing pressurized hydraulic fluid to the load having the lower maximum working pressure, said valve member means being responsive to stimulus external to said control valve means.

2. The apparatus as defined in claim 1 wherein the body assembly of said dual override pressure adjustor assembly is characterized further to include:

a longitudinal passageway extending therethrough in substantial coaxial alignment with the spool valve member of said override valve assembly means, said longitudinal passageway including a first cylindrical portion positioned adjacent to the spring means of said override valve assembly means, and a second cylindrical portion coaxial with and having a diameter less than the diameter of the first cylindrical portion extending away from said override valve assembly means, a port formed therein communicating between the exterior thereof and the longitudinal passageway intermediate the first and second cylindrical portions thereof, and an annular shoulder interconnecting said first and second cylindrical portions; and wherein the piston means of said dual override pressure adjustor assembly is characterized further to include:

a piston slidably disposed within the longitudinal passageway in the body assembly for longitudinal movement therein, said piston having a first end portion and a second end portion, a longitudinal passageway extending therethrough and intersecting the first and second end portions, an outwardly extending flange formed thereon adjacent to the first end portion thereof having a cylindrically shaped outer periphery slidably received within the first cylindrical portion of the longitudinal passageway of the body assembly, an annular shoulder intersecting the outer periphery of the flange portion intermediate the first and second end portions, a cylindrically shaped outer periphery formed on the piston adjacent to the second end portion intersected by the annular shoulder and slidably received within the second cylindrical portion of the longitudinal passageway, first annular seal means positioned between the flange of the piston and the first cylindrical portion of the longitudinal passageway of the body assembly for providing a sliding fluid tight seal therebetween, second annular seal means positioned between the piston and the second cylindrical portion of the longitudinal passageway of the body assembly for providing a fluid tight seal therebetween, and internal threads formed in the longitudinal passageway through the piston; and a pressure override spring adjustor disposed within the longitudinal passageway through the piston with the first end portion thereof extending beyond the first end portion of the piston and engaging the spring means of said override valve assembly means and the second end portion thereof extending beyond the second end portion of the piston, and external threads formed on the adjustor threadedly engaged with the internal threads in the longitudinal passageway through the piston and extending a distance beyond the second end portion of the piston.

3. The apparatus as defined in claim 1 wherein the body assembly of said dual override pressure adjustor assembly is characterized further to include:
- an adaptor member fixedly secured to said override valve assembly means, said adaptor member having a first end portion with a first end face formed thereon, a second end portion adjacent to said override valve assembly means, a longitudinal bore formed in the second end portion coaxial with the spool valve member, a counterbore formed in the first end portion coaxial with the longitudinal bore and connected thereto by an annular shoulder, and internal threads formed in the counterbore adjacent to the first end portion;
- a body member, having first and second end faces and a longitudinal passageway therethrough intersecting the first and second end faces, and having external threads formed thereon and threadedly engaged with the internal threads of said adaptor member, the longitudinal passageway of said body member including a first cylindrical portion intersecting the second end face thereof coaxial with and having a diameter greater than the longitudinal bore of said adaptor member, an annular shoulder extending radially inwardly from the first cylindrical portion, a second cylindrical portion intersecting the first end face of said body member coaxial with and having a diameter less than the first cylindrical portion, and a port formed therein communicating between the exterior thereof and the longitudinal passageway intermediate the first and second cylindrical portions thereof; and
- spacer means disposed intermediate said adaptor member and said body member for establishing a predetermined longitudinal distance between the annular shoulder of said adaptor member and the annular shoulder of said body member; and wherein the piston means of said dual override pressure adjustor assembly is characterized further to include:
- a piston slidably disposed within the longitudinal passageway through said body member for longitudinal movement therein, said piston having a first end portion and a second end portion, a longitudinal passageway extending therethrough and intersecting the first and second end portions thereof, an outwardly extending flange portion formed thereon adjacent to the first end portion thereof having a cylindrically shaped outer periphery slidably received within the first cylindrical portion of the longitudinal passageway through said body member, an annular shoulder intersecting the outer periphery of the flange portion intermediate the first and second end portions, a cylindrically shaped outer periphery formed on the piston adjacent to the second end portion and slidably received within the second cylindrical portion of the longitudinal passageway through said body member, first annular seal means positioned between the flange of the piston and the first cylindrical portion of the longitudinal passageway through said body member for providing a sliding fluid tight seal therebetween, second annular seal means positioned between the piston and the second cylindrical portion of the longitudinal passageway through said body member for providing a fluid tight seal therebetween, and internal threads formed in the longitudinal passageway through said piston; and
- a pressure override spring adjustor disposed within the longitudinal passageway through said piston with the first end portion thereof extending beyond the first end portion of the piston and engaging the spring means of said override valve assembly means and the second end portion thereof extending beyond the second end portion of said piston, and external threads formed on the spring adjustor and threadedly engaged with the internal threads in the longitudinal passageway through said piston and extending a distance beyond the second end portion of said piston.

4. The apparatus as defined in claim 3 wherein the longitudinal movement of said piston within the body assembly of said dual override pressure adjustor is limited by abutment of the first end portion of the piston with the annular shoulder of said adaptor member in one direction, and by the abutment of the annular shoulder of said piston with the annular shoulder in the longitudinal passageway through said body member.

5. The apparatus as defined in claim 4 wherein said spacer means is characterized further to include:
- an annular spacer disposed intermediate the annular shoulder of said adaptor member and the second end face of said body member.

6. The apparatus as defined in claim 4 wherein said body member is characterized further to include:
- an outwardly extending annular shoulder formed on the exterior thereof intermediate external threads and the first end face thereof; and wherein said spacer means is characterized further to include:
- an annular spacer disposed intermediate the first end face of said adaptor member and said outwardly extending annular shoulder of said body member.

7. The apparatus as defined in claim 4 characterized further to include:
- locking nut means threadedly engaged with the external threads of said pressure override spring adjustor for lockingly engaging the second end portion of said piston to secure said adjustor to said piston when properly adjusted relative thereto.

8. An apparatus for automatically varying the axial loading of a helical compression spring biasing a pressure override valve spool carried by a pressure override housing in response to the application of fluid pressure thereto from an external source, comprising:
- a body assembly secured to the pressure override housing having a first end portion, a second end portion, a longitudinal passageway extending therethrough and intersecting the first and second end portions, a first cylindrical surface formed in and coaxial with the longitudinal passageway adjacent to the first end portion, a second cylindrical surface formed in and coaxial with the longitudinal passageway intermediate the first cylindrical surface and the second end portion and having a diameter greater than the diameter of the first cylindrical surface, a third cylindrical surface formed in and coaxial with the longitudinal passageway intermediate the second cylindrical surface and the second end portion and having a diameter less than the diameter of the second cylindrical surface, a first annular shoulder extending radially inwardly from the second cylindrical surface, a second annular shoulder extending radially outwardly from the third cylindrical surface, and a port formed therein and communicating between the longitudinal passageway intermediate the first and second cylindrical surfaces and the external source of fluid pressure;

a piston slidably disposed within the longitudinal passageway in said body assembly for longitudinal movement therein, said piston having a first end portion, a second and portion, a longitudinal passageway extending therethrough and intersecting the first and second end portions, a radially outwardly extending flange formed thereon adjacent to the first end portion thereof having a cylindrically shaped outer periphery formed thereon coaxial with and longitudinally slidably received within the second cylindrical surface of said body assembly, an annular end face formed on the first end portion of said piston intersecting the cylindrically shaped outer periphery of the flange, an annular shoulder intersecting and extending radially inwardly from the cylindrically shaped outer periphery of the flange intermediate the annular end face and the second end portion of said piston, the longitudinal distance between the annular end face and the annular shoulder being less than the longitudinal distance between the first and second annular shoulders of said body assembly, a cylindrically shaped outer periphery formed on said piston adjacent to the second end portion thereof coaxial with and longitudinally slidably received within the first cylindrical surface formed in the passageway of said body assembly, first annular seal means positioned between said piston and the first cylindrical surface in said body assembly for providing a sliding fluid tight seal therebetween, second annular seal means positioned between the flange of said piston and the second cylindrical surface in said body member for providing a sliding fluid tight seal therebetween, and internal threads formed in the longitudinal passageway through said piston; and a spring-engaging adjustor disposed within and coaxially aligned with the longitudinal passageway in said piston, said adjustor having a first end portion extending beyond the first end portion of said piston, a second end portion extending beyond the second end portion of said piston, end face means formed on the first end portion of said adjustor for engaging one end of the helical compression spring, external threads formed on the second end portion of said adjustor in threaded engagement with the internal threads of said piston and extending a distance beyond the second end portion of said piston, and adjusting means formed on the second end portion of said adjustor for receiving external force to rotate said adjustor relative to said piston thereby adjusting the longitudinal position of said adjustor relative to said piston.

9. The apparatus as defined in claim 8 characterized further to include:

locking nut means threadedly engaged with the external threads of said adjustor for lockingly engaging the second end portion of said piston to secure said adjustor to said piston when properly adjusted relative thereto.

* * * * *